United States Patent
Cupples et al.

(10) Patent No.: US 7,298,281 B2
(45) Date of Patent: Nov. 20, 2007

(54) SYSTEM AND METHOD FOR VERIFYING INSTALLATION OF A TANK LEVEL MONITOR

(75) Inventors: Kenneth Alan Cupples, Knoxville, TN (US); Richard L. Carl, Knoxville, TN (US)

(73) Assignee: Robertshaw Controls Company, Richmond, VA (US)

( * ) Notice: Subject to any disclaimer, the term of this patent is extended or adjusted under 35 U.S.C. 154(b) by 192 days.

(21) Appl. No.: 11/199,751

(22) Filed: Aug. 9, 2005

(65) Prior Publication Data

US 2006/0036386 A1    Feb. 16, 2006

Related U.S. Application Data

(60) Provisional application No. 60/600,156, filed on Aug. 10, 2004.

(51) Int. Cl.
*G08B 29/00* (2006.01)
*G08B 21/00* (2006.01)
*G01C 25/00* (2006.01)
*G06F 19/00* (2006.01)

(52) U.S. Cl. ............... 340/612; 340/514; 340/618; 702/116; 702/122

(58) Field of Classification Search ......... 340/612, 340/514, 618; 702/100, 116, 122, 182–185
See application file for complete search history.

(56) References Cited

U.S. PATENT DOCUMENTS

| | | | |
|---|---|---|---|
| 5,363,093 A * | 11/1994 | Williams et al. ............ 340/605 |
| 5,785,100 A * | 7/1998 | Showalter et al. ........... 141/198 |
| 5,842,157 A | 11/1998 | Wehhofer et al. |
| 5,874,895 A | 2/1999 | Devarney |
| 6,691,064 B2 | 2/2004 | Vroman |
| 6,766,835 B1 | 7/2004 | Fima |
| 6,867,707 B1 * | 3/2005 | Kelley et al. ........... 340/870.02 |
| 7,042,349 B2 * | 5/2006 | Bergman et al. ............ 340/514 |
| 7,174,783 B2 * | 2/2007 | McSheffrey et al. .......... 73/291 |
| 2003/0029223 A1 | 2/2003 | Taylor, III et al. |
| 2003/0093406 A1 | 5/2003 | Zellner et al. |
| 2006/0036515 A1 * | 2/2006 | Ingalsbe et al. .............. 705/28 |

* cited by examiner

*Primary Examiner*—Toan N. Pham
(74) *Attorney, Agent, or Firm*—Reinhart Boerner Van Deuren P.C.

(57) ABSTRACT

A system and method of verifying the installation and data path used by a tank level monitor is provided. Once an installer completes the installation of the tank level monitor, the monitor is activated. The monitor performs a self test and transmits information to a data center. Preferably, the transmission is via a cellular communication network. Once the data center receives the information from the newly installed tank level monitor, the data center generates a text based message that is sent to the installer to verify that the installation was successful. The message from the data center is preferably an email message that can be delivered to a wireless messaging device held by the installer. The generation and transmission of the verification message should be approximately immediate, and certainly within five minutes to provide rapid feed back to the installer.

20 Claims, 1 Drawing Sheet

SYSTEM AND METHOD FOR VERIFYING INSTALLATION OF A TANK LEVEL MONITOR

CROSS-REFERENCE TO RELATED PATENT APPLICATIONS

This patent application claims the benefit of U.S. Provisional Patent Application No. 60/600,156, filed Aug. 10, 2004, the entire teachings and disclosure of which are hereby incorporated in their entireties by reference thereto.

FIELD OF THE INVENTION

This invention generally relates to tank level monitoring systems, and more particularly to a system for verifying proper installation of a monitor on a tank to be monitored.

BACKGROUND OF THE INVENTION

Storage tanks containing fluids are used throughout most of the world. As part of the storage tank, there is normally a monitor attached to the storage tank to monitor the level of fluid within the tank. The monitor is often in wired or wireless communication with a data center or other facility from which the owner of the tank can stay apprised of the amount of product in the storage tank.

When installing a monitor on a tank that is remotely located from the data center, it is important to verify that the installation of the monitor was successful while the installation personnel are still on site. Since some storage facilities are located in remote or rural areas, repeated service calls or visits by the installation personnel can be quite costly. In previous systems, once an installer installs the monitor on the tank to be monitored, the installation personnel activates the monitor. The monitor would then run a self test to be make sure that it is operating properly and to determine if the installation was successful. Once this self test is complete, the status of the installation is communicated to the installation personnel using a digital or analog display.

An LED is one type of display/method that has been used to show the status or to determine if the operation after installation of the monitor on the storage tank was successful. However, since LEDs are limited to two discrete states per LED, the information transmitted to the installer may be incomplete or insufficient to provide details of any erroneous operation. If there is a problem, having an LED not turn on does not provide sufficient information as to what the problem might be. This type of display can also be cumbersome, waste battery power and require the enclosure to be opened. Also with LEDs, there is no convenient (if any) means of storing problems/information over a series of separate installations. Such installation information would be useful in tracking and tracing design, manufacturing and installation method problems.

Other storage tank monitors have used LCDs to display information to the installation personnel regarding the installation of the monitor. While this may be slightly more advanced than a simple LED, the information passed on to the installer is still limited. For example, a code number may display on the LCD. This code number will translate to a problem or status of the installation. Even though this is more information that a simple LED can present, this code number must be inconveniently looked up or translated to determine what the code represents. The LCD will also have similar problems as listed with the LEDs, including lack of permanent storage capability.

Other storage tank monitoring systems have used a hard-wired connection to a data center to check for operation after installation. However, this can be a burden to set up and be costly. This burden and cost may include special know-how and special tools for installers to use. It may also require as with the LEDs and LCDs the enclosure to be opened.

While each of these prior methods provides some measure of confidence that the installation was successful, none of them have the ability to check the entire data path for proper operation. This is especially true in wireless tank level monitoring systems, which require signal strength and may rely on various hops along the data path before the information arrives at the data center.

Therefore, there exists a need in the art for a system and method of providing verification of proper installation and operation of a tank level monitor that is capable of testing the entire data path and that provides the installer rapid verification while still on site. The present invention provides such a system and method. These and other advantages of the invention, as well as additional inventive features, will be apparent from the description of the invention provided herein.

BRIEF SUMMARY OF THE INVENTION

The present invention provides a new and improved installation verification system and method for a tank level monitoring system. More particularly, the present invention provides a new and improved installation verification system for a tank level monitor that verifies that the tank level monitor is operating properly and that tests the entire data path from the monitor to the data center. The present invention provides feedback to the installer regarding the installation and operational status of the entire data path.

In one embodiment of the present invention, the installation verification system sends a wireless message to the installer to notify the installer that the installation of the monitor was done correctly and to verity the data path integrity (of the monitor network) on which the monitor information was sent to the data center. In a preferred embodiment of the present invention, the monitor uses state-of-the-art cellular transmission technology to send a message from the monitor to a data center when activated by the installer. The data center then sends a verification text based email message to the installer to inform the installer of the installation and the data path integrity. This text based message may be sent to the installer's cell phone, text pager, or other wireless device while the installer is still on site at the installation location.

Through the system of the present invention, the entire data path of the monitor network is tested for reliability. Further, this system and method is not cumbersome, does not waste battery power or requires that the enclosure be opened in order to verify the storage tank monitor installation status. It does not rely on cryptic LEDs, LCDs or a wired connection to determine if the storage tank monitor was installed successfully.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1:
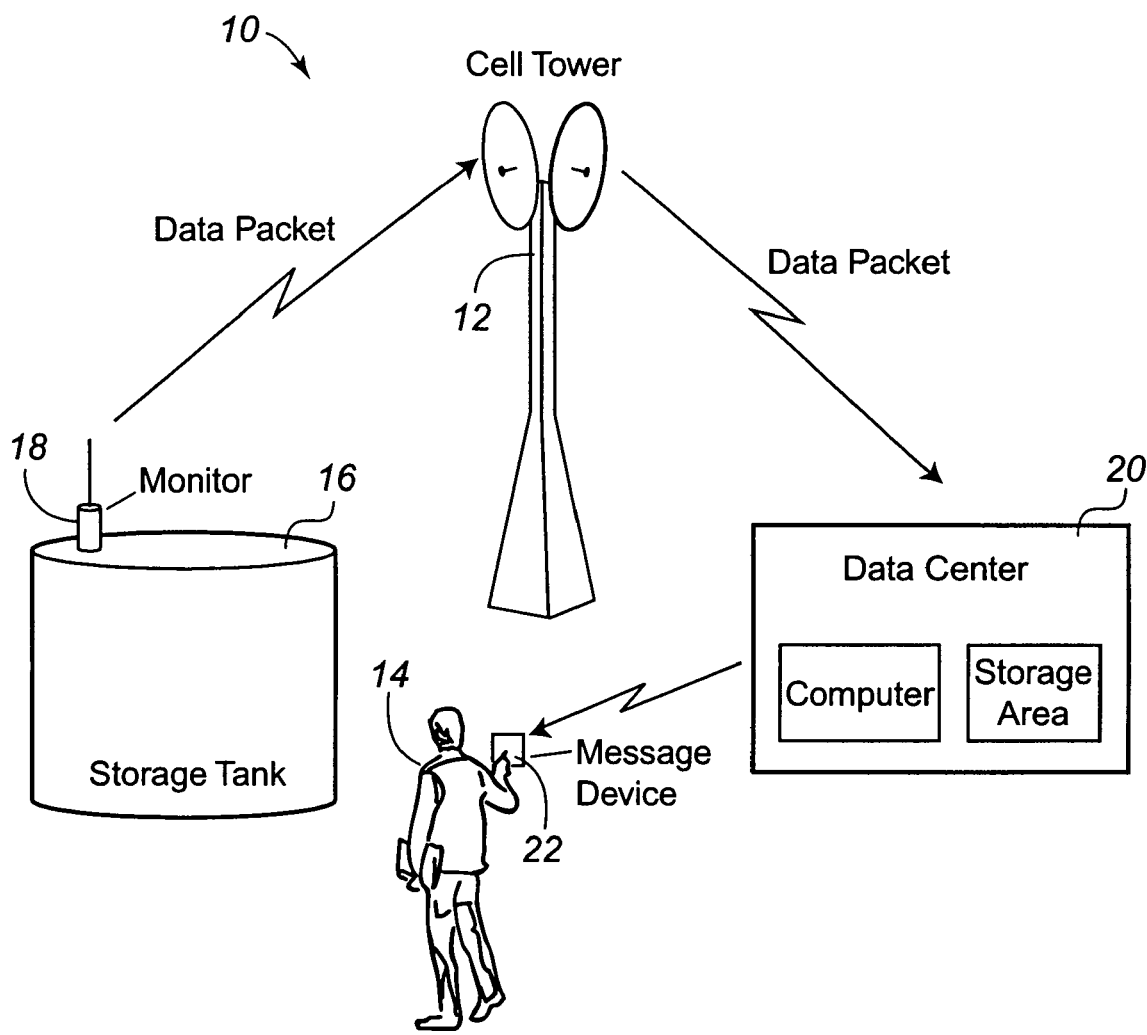
FIG. 1 is a simplified schematic illustration of a tank level monitor installation verification system constructed in accordance with an embodiment of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Referring to FIG. 1, a system 10 capable of monitoring a level of product in a tank 16 using a monitor 18 and communicating that information to a data center 20 via a wireless data channel, e.g. a cellular communications network including cell tower 12, is illustrated. As will be explained more fully below, in the system 10 of the present invention a method is provided that advantageously provides rapid feed back to an installer 14 via a messaging device 22, such as a cell phone, pager, Blackberry, etc., that the installation of the monitor 18 and data communication of the communication network to the data center 20 is successful. This computer or data center 20 may be a centralized facility which monitors and reports on numerous tank installations, may be a thin client that communicates with such a data center, or may be a stand alone computer at an installation or remote that receives information directly from the tank level monitor 18.

As in a typical tank level monitoring system, such as the Centeron® tank level monitoring system available from Robertshaw Industrial Products of Maryville, Tenn., the monitor 18 is operatively coupled to the tank 16 and designed to monitor the level of the product in the tank. The monitor 18 can be one of a variety of monitors such as, for example, a gauge monitor, a radar monitor, an ultrasonic monitor, a pressure monitor, a float monitor, a capacitance monitor, etc. Communications from and with these monitors 18 can be via wired communications, wireless radio frequency (RF) communications, cellular, satellite, etc. or a combination of these depending on the installation location, location of the computer/data center 20, the user, etc.

In addition to having the ability to observe the level of product in the tank 16, the monitor is able to relay information regarding the product to the user, e.g. temperature of the product in the storage tank 16. Depending on the communication channel utilized by the particular monitor 18 and the cost/availability of data transfer over that channel, the monitor 18 may be required to store data and information regarding the product and perform logic operations between information transmission sessions. In such an embodiment, the monitor 18 is provided with, for example, a memory, a processing unit, and/or other components such that the monitor is considered to be a "smart" device. One such monitor is the Quicksilver™ cellular monitor, which provides only periodic cellular transmissions that may include information regarding many readings, operation of the tank, etc. based on the cost of cellular communications.

The computer or data center 20 can comprise a single computer, a server, a network of computers and/or servers, and the like. In general, the data center 20 can comprise almost any device that includes a microprocessor or other computing means. The data center 20 is well suited to make comparisons, store statistics, relay data, display information and/or perform logic calculations relating to the monitoring of tank levels and relaying that information to users. This information may be made available to such users via the Internet or other means. Upon the occurrence of certain provided conditions, the data center 20 generates an alarm signal (or simply an alarm or signal) that may be displayed or announced locally at the data center 20, or may be relayed to a user.

When the monitor 18 is first installed on the tank 16 by the installer 14, the installer needs to verify that the monitor is operating properly. In accordance with one embodiment of the present invention, once the installer 14 installs the monitor 18, the installer activates the monitor 18. In the preferred embodiment, the monitor is activated with a magnet. However, any method or hardware able to activate an electronic device known in the art can be used. The monitor then runs its self-test and transmits data to the data center 20 as it will during normal operation. In a preferred embodiment, the monitor 18 utilizes its cellular modem to transmit this information upon initialization over the cellular communications network to the data center 20.

Once the data center 20 receives the initial transmission of information from the newly installed monitor 18, the data center generates a notification message to be sent to the installer's messaging device 22. Preferably, this notification message is a text based email message that can be sent to the installer 14. This notification message can contain text based relevant information concerning the status of the installed monitor, thereby dispensing with the need to decode information by the installer 14.

Preferably, the data center 20 transmits the verification message as soon as it received the information from the newly installed monitor 18. The installer 14 waits momentarily to receive the message as to whether or not the installation was successful. The momentary waiting is the result of a series of electronic communications (message transmissions) that have sub-destination points along a data path to the final destination of the installer, to be now described.

Upon activation of the monitor, the capabilities previously described within the logic unit of the monitor execute in the order presented. The monitor gathers tank information including level data, battery strength and positive installation status of the monitor via the sensor network of the monitor. The logic unit then creates a message based on the retrieved data from the sensor network.

The message is transmitted via the transmitter of the monitor to a robust wireless data link. The preferred embodiment is for the monitor's transmitter to use cellular network technology to provide this segment as part of the data path. The transmission of the message continues as the wireless data link accepts the message from the monitor and then transmits/redirects the message to a data center 20.

The data center 20 is an integration of software and hardware components. One component is a receiver. The receiver directs the message to a logic unit. This logic unit processes the incoming message from the monitor. Upon verification that the information is correct, the data center 20 generates a text message suitable for the installer 14 to understand. In the preferred embodiment, the logic unit is a computer. However, any device known in the art for processing electronic data can be used.

The data center 20 may also include a wireless or other transmitter, possibly including a connection to the Internet. The transmitter is used to complete the information path back to the installer. The transmitter receives the text message from the logic unit and transmits the text message to a ready receiver in the messaging device 22 normally monitored by the installer 14. The potential list of devices 22 includes cell phones, data pager, an email box, PDAs, etc. However, any device known in the art for receiving electronic messages may be used.

At this point, the installer 14 should have received the message from the data center 20. The response, once the installer 14 activates the monitor 18, should normally be within a few seconds, but generally not more than five minutes. If the installer 14 does not receive a message within this timeframe, it can be assumed that the monitor 18 or the data path is broken.

Otherwise, if the installer 14 receives the text message, the installer 14 may respond based on the message. If the message shows success, the installer's task is finished. However, any other text message normally indicates a problem with the installation. The text within the message will provide an explanation as to what the monitor perceives the problem to be. The installer 14 can use this information to make repairs and start the process again until a successful installation is achieved.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of verifying installation and data path integrity of a tank level monitor, comprising the steps of:

installing the tank level monitor on a storage tank;

activating the tank level monitor; and awaiting receipt by an installer a verification message from a data center.

2. The method of claim 1, further comprising the step of receiving the verification message.

3. The method of claim 2, wherein the step of receiving the verification message comprises the step of receiving a text based verification message, the method further comprising the step of reading the text based verification message to ensure proper installation and data path integrity of the tank level monitor.

4. The method of claim 2, wherein the step of receiving the verification message comprises the step of receiving an email containing the verification message.

5. The method of claim 1, further comprising the step of determining that the installation or data path integrity is bad after awaiting the verification message for a first period without receiving the verification message.

6. The method of claim 5, wherein the step of determining that the installation or data path integrity is bad comprises the step of determining that the installation or data path integrity is bad after awaiting the verification message for approximately five minutes.

7. The method of claim 6, further comprising the step of repeating the steps of installing, activating and awaiting.

8. The method of claim 6, further comprising the step of troubleshooting the installation of the tank level monitor.

9. A method of verifying installation and data path integrity of a tank level monitor, comprising the steps of:

receiving an activation message from the tank level monitor verifying the activation message;

generating a verification message; and transmitting the verification message to an installer.

10. The method of claim 9, wherein the step of generating a verification message comprises the step of generating a text based verification message.

11. The method of claim 10, wherein the step of generating a text based verification message comprises the step of generating a text based email verification message, and wherein the step of transmitting the verification message comprises the step of mailing the text based email verification message to the installer.

12. The method of claim 9, further comprising the steps of:

detecting a problem from information in the activation message;

generating a troubleshooting message; and transmitting the troubleshooting message to the installer.

13. A tank level monitoring system, comprising:

a tank level monitor installed on a storage tank to measure the level of product therein;

a data center adapted to receive transmissions from the monitor; and wherein the tank level monitor transmits an activation message to the data center upon activation thereof; and wherein the data center verifies information in the activation message, generates a verification message, and transmits the verification message to an installer of the tank level monitor.

14. The system of claim 13, wherein the tank level monitor is activated by a magnet.

15. The system of claim 13, wherein the tank level monitor is configured to run a self test upon activation, to sense information regarding a tank on which it is installed, and to include such information and results of the self test in the activation message.

16. The system of claim 13, wherein the tank level monitor is a cellular monitor and wherein the tank level monitor transmits the activation message over a cellular communication network.

17. The system of claim 13, wherein the verification message is a text based email message.

18. The system of claim 13, wherein the installer has a wireless messaging device, and wherein the data center transmits the verification message to the wireless messaging device.

19. The system of claim 13, wherein the data center verifies information in the activation message, generates a verification message, and transmits the verification message to an installer of the tank level monitor without delay.

20. The system of claim 13, wherein the tank level monitor is a battery powered cellular monitor.

* * * * *